US010460468B2

(12) United States Patent
Song et al.

(10) Patent No.: US 10,460,468 B2
(45) Date of Patent: Oct. 29, 2019

(54) USER POSE AND ITEM CORRELATION

(71) Applicant: Motorola Mobility LLC, Chicago, IL (US)

(72) Inventors: Miao Song, Naperville, IL (US); Yunming Wang, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 137 days.

(21) Appl. No.: 15/844,179

(22) Filed: Dec. 15, 2017

(65) Prior Publication Data

US 2019/0188876 A1 Jun. 20, 2019

(51) Int. Cl.
| | |
|---|---|
| *G06K 7/10* | (2006.01) |
| *G06K 9/00* | (2006.01) |
| *G06Q 30/06* | (2012.01) |
| *G06T 7/70* | (2017.01) |

(52) U.S. Cl.
CPC ............ *G06T 7/70* (2017.01); *G06K 7/10297* (2013.01); *G06K 7/10425* (2013.01); *G06K 9/00342* (2013.01); *G06K 9/00355* (2013.01); *G06Q 30/0613* (2013.01); *G06T 2207/30196* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 9,443,222 | B2* | 9/2016 | Singel | G06Q 10/087 |
| 9,911,290 | B1* | 3/2018 | Zalewski | G07G 1/0072 |
| 2012/0233076 | A1* | 9/2012 | Sutcliffe | G06Q 30/02 |
| | | | | 705/50 |
| 2014/0152882 | A1* | 6/2014 | Samek | G06Q 10/08 |
| | | | | 348/333.02 |
| 2015/0019391 | A1* | 1/2015 | Kumar | G07G 1/0036 |
| | | | | 705/28 |
| 2015/0379770 | A1* | 12/2015 | Haley, Jr. | G02B 27/0172 |
| | | | | 345/633 |

* cited by examiner

*Primary Examiner* — Soo Shin
(74) *Attorney, Agent, or Firm* — SBMC

(57) ABSTRACT

In aspects of user pose and item correlation, a mobile device includes a correlation module that receives an indication a user of the mobile device has positioned a hand proximate an item based on a pose of the user. The mobile device includes wireless radio systems to scan for wireless-enabled devices corresponding to items tagged with the wireless-enabled devices. The correlation module of the mobile device is implemented to receive the indication that the hand of the user of the mobile device is positioned proximate the item, and initiate a scan from the mobile device for the wireless-enabled devices proximate the user based on the indication of the hand of the user positioned proximate the item. The correlation module receives identifying data of the item that is proximate the hand of the user responsive to the scan of the wireless-enabled devices, and can correlate the item with the user.

20 Claims, 5 Drawing Sheets

USER POSE AND ITEM CORRELATION

BACKGROUND

Wireless tags used for wireless radio-signaling, such as radio frequency identification (RFID) tags or labels, can include memory to store data that identifies a wireless tag, as well as other information about an object or item that the wireless tag may be associated with. A wireless tag may be attached to an object or item, or included in packaging of an object or item. Conventional systems used for tracking inventory in a warehouse or retail store environment with RFID tags involves using multiple stationary RFID readers with high power antennas to triangulate the position of the wireless tags. This type of RFID tracking system is not cost effective to implement, difficult to scale, and requires complex setup. The same can be said for using other types of tracking systems, such as with cameras that may encounter resolution, lighting, and environmental conditions that interfere with being able to track inventory and/or retail items in a retail store environment. Other types of systems may employ infra-red lighting, pressure sensors, and/or load sensors on product shelves in an effort to identify inventory and products that are picked up and handled, but are also expensive to implement and require complex setup.

With reference to retail and product sales in a retail store environment, conventional systems are not able to adequately track products that may be considered for purchase by a shopper, but then ultimately placed back on the shelf or left at checkout without a product sale. With a typical on-line retail website interface that provides an on-line shopping cart where a shopper can temporarily place items for purchase, an on-line retailer will know exactly the items that the shopper browsed, the items selected and placed in the on-line shopping cart, and the items that were subsequently purchased, removed from the on-line shopping cart, or simply left in the on-line shopping cart when the shopper navigates away from the website. There is no comparable system for tracking the products that a shopper considers in a retail store environment, where the shopper may select an item off the shelf and subsequently place it back on the shelf, place the item in a shopping cart or basket, or simply carry the item with them for purchase. In these types of conventional retail store environments, only the items that a shopper actually purchases at checkout are trackable as purchased inventory.

BRIEF DESCRIPTION OF THE DRAWINGS

Aspects of user pose and item correlation are described with reference to the following Figures. The same numbers may be used throughout to reference similar features and components that are shown in the Figures.

DETAILED DESCRIPTION

Figure 1:
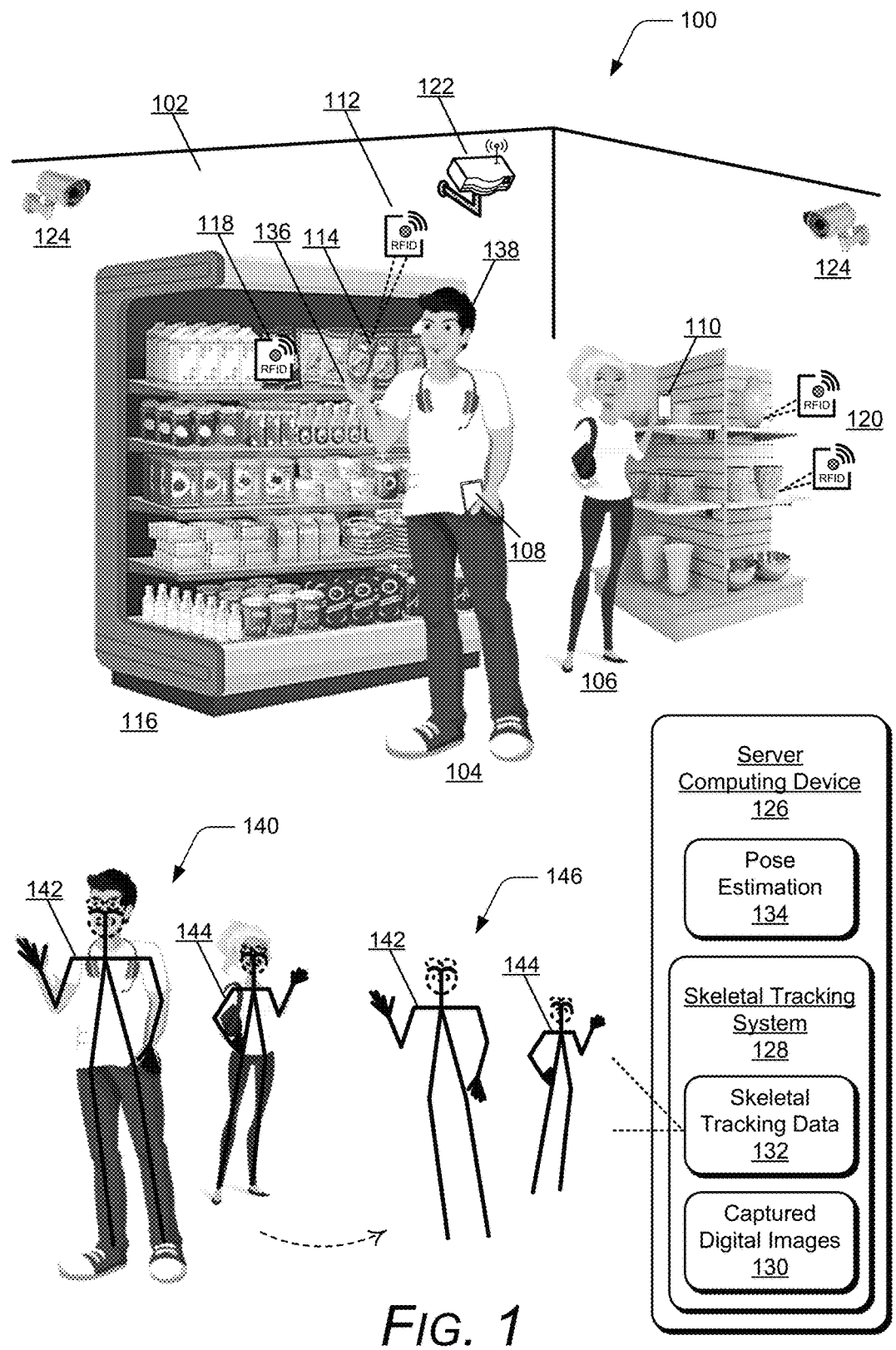
FIG. 1 illustrates an example environment in which aspects of user pose and item correlation can be implemented.

User pose and item correlation is described, and may be implemented by a mobile device that includes a radio frequency identification (RFID) reader, such as a mobile phone that includes the RFID reader either as an integrated component or as an attachment that operates with the mobile phone. Generally, a user with a mobile phone will carry the device when visiting a retail environment, such as any type of retail store that a person may enter looking for an item to purchase, a warehouse that a person may enter looking for a stocked item, a library where a person may browse magazines and borrow reading material, and any other type of environment that a person might visit while carrying a mobile phone. Any of the retail environments may be setup as a geo-fenced area, and as the user carries the mobile phone, entry into a geo-fenced area can be detected, such as by the mobile phone and/or by a controller device of the geo-fenced area. Generally, a geo-fenced area can be established as a virtual perimeter around a boundary of any structure or environment.

In aspects of user pose and item correlation, a skeletal tracking system can be utilized to detect a pose of a person in any of the described retail environments, such as when a hand of a person is positioned proximate an item, or when a person picks up the item and the skeletal tracking system detects a pickup gesture by the person. The skeletal tracking system can detect the pickup gesture by the person based on skeletal tracking data as determined by image processing techniques of captured digital images of the person moving to pick up the item. For example, any of the described retail environments can include surveillance cameras that capture digital images, such as digital photos and/or video of shoppers in a store, and the digital images can be captured by a network of the surveillance cameras as the digital photos and/or video. A retail environment may also include a business server system that includes a server computing device to implement the skeletal tracking system, which receives the digital images and detects the gestures and subsequent poses of the shoppers based on the skeletal tracking data. Alternatively or in addition, the mobile phone carried by a person in a retail environment can implement the skeletal tracking system, which receives the digital images from an integrated camera of the device and/or receives sensor data, such as from an inertial measurement unit of the device, and detects the gestures and subsequent poses of the person.

In aspects of user pose and item correlation, a server computing device or a mobile phone can also implement a correlation module that is designed to determine a pose estimation based on the skeletal tracking data from the skeletal tracking system. In the example of a retail environment that includes a business server system, the server computing device can communicate the pose estimation and/or the skeletal tracking data to the mobile phone carried by the person in the retail environment. The mobile phone of the person receives the pose estimation, or determines the pose estimation based on the skeletal tracking data, as an indication that that a hand of the person is positioned proximate an item, or the person has picked up the item, and can then initiate a scan from the mobile phone with the RFID reader for wireless-enabled devices proximate the person based on the indication that the person has picked up the item. As used herein, the terms "person" and "user" are generally interchangeable, where a person with a mobile phone is also the user of the mobile phone in any of the retail environments described herein.

Some or all of the items in a retail environment, such as the products for purchase in a retail store and the items in an inventory environment, can be tagged with wireless-enabled devices, such as RFID tags or other types of wireless radio-based tags. In this example, the RFID tags include memory to store data that identifies a wireless tag, as well as other information about an object or item that the wireless tag is associated with. As noted above, the RFID tags can be attached to the products for sale in a retail store environment, or can be included in the packaging of the products. The various tagged items can then be identified based on the scanning by the RFID reader of the mobile phone.

In response to the scan for the wireless-enabled devices that identify the products in the retail environment, the RFID reader of the mobile phone receives the identifying data of an item that is proximate the hand of the person or picked up by the person, and the item can be correlated with the user as an item of interest to the user. Additionally, the RFID reader can receive identifying data corresponding to additional items proximate the person in a region of the retail environment where the hand of the user is positioned proximate the initial item, or the person has picked up the initial item. The additional items, or a category of the items, may also be correlated with the person as items of interest to the person, or as a category of items that the person may be interested in.

For example, a person may be shopping for a type of specific tool in a home improvement store, and pick up the tool from the shelf or display rack. When the mobile device that is associated with the person receives the pose estimation as the indication that the person is proximate to the tool or has picked up the tool, and initiates the RFID reader scan for the identifying data of the specific tool, the mobile device can receive not only the identifying data of the tool that the person has picked up, but also identifying data of other tools proximate the person in the region of the home improvement store where the person is located. The specific tool can then be correlated with the person as an item of interest to the person, as well as the general category of tools can be correlated with the person as a category of items or a generic group of items that may be of interest to the person.

The described features of user pose and item correlation can be implemented to correlate meaningful pose behavior of a person as related to shopping, inventory control, reading material, and the like, with identified items, such as products for sale in a retail store, stocked items in a warehouse, reading material in a library, or any other similar environment. The correlation of items and/or categories of items to persons in a retail environment provides shopping behavior tracking data similar to aspects of an on-line retail website, also referred to as on-line digital click-tracking. Generally, an on-line retailer can track the items that a shopper browsed, the items selected and placed in an on-line shopping cart, and the items that are purchased, removed from the on-line shopping cart, or simply left in the on-line shopping cart when the shopper navigates away from the website.

While features and concepts of user pose and item correlation can be implemented in any number of different devices, systems, environments, and/or configurations, aspects of user pose and item correlation are described in the context of the following example devices, systems, and methods.

FIG. 1 illustrates an example environment 100 in which aspects of user pose and item correlation can be implemented. The example environment 100 is representative of a retail environment 102, such as any type of retail store that a person 104 (e.g., the illustrated man) may enter looking for an item to purchase, a warehouse that a person 106 (e.g., the illustrated woman) may enter looking for a stocked item, a library where a person may browse magazines and borrow reading material, or any other type of environment that a person might visit while carrying a mobile phone. In this example, the man is carrying a mobile phone 108 and the woman is carrying a mobile phone 110. The mobile phones 108, 110 that are carried by the man and the woman are examples of any type of mobile device, such as the mobile device 202 shown and described with reference to FIG. 2. The terms "person" and "user" are generally used herein interchangeably, where the person 104 with the mobile phone 108 is also the user of the mobile phone in the retail environment. The example environment 100 may also be implemented as a geo-fenced area, which generally can be established as a virtual perimeter around a boundary of any structure or environment, such as a building, an area of a building, a retail store, a warehouse, an outdoor region, or any other environment or designated area.

As a retail store or warehouse, the retail environment 102 can include any number of inventoried items, objects, and products for purchase, each of which can be identified and tracked with a radio frequency identification (RFID) tag. In this example, a RFID tag 112 is associated with (e.g., is attached to) an item 114, which the person 104 is shown as having picked up from the shelf in the product display case 116. Generally, the RFID tag 112 includes a memory that stores identifying data of the item 114 that the RFID tag is associated with, as well as a unique identifier of the particular RFID tag 112 and may include any other type of metadata, such as location data that indicates a location or region of the item 114 in the retail environment 102. The other products in the product display case 116 can also each be identified by a respective RFID tag 118, of which only one representative wireless-tag is shown in this example. Similarly, the other stocked items may each be identified by a respective RFID tag 120 in the retail environment 102. Generally, the RFID tags are small electronic tags or labels that can be programmed with data and other information stored in memory on a RFID tag, and the RFID tags can be associated with any type of object or item, such as by being placed in or affixed to an object for inventory tracking, item location, item recovery, and the like.

As described herein, the wireless radio-based tags can include the RFID tag 112, as well as any number of the additional RFID tags 118, 120 that each corresponds to respective items in the retail environment 102. Additionally, the wireless-radio based tags can be implemented for various different radio-based, wireless tag signaling, such as with LTE, Near Field Communication (NFC), Real-time Locating System (RTLS), Bluetooth™ devices, and the like. In this example, the retail environment 102 may also include Internet-of-things (IoT) network devices, Wi-Fi connected devices 122, and/or additional mobile devices. The IoT devices in the retail environment 102 may also include motion sensors, the surveillance cameras 124, monitoring devices, control devices, and any other type of networked computing and/or electronic devices.

In this example, the retail environment 102 may also include a business server system that includes a server computing device 126 to implement a skeletal tracking system 128. The skeletal tracking system 128 may include independent processing, memory, and logic components functioning as a computing and/or electronic device integrated with the server computing device 126. Alternatively or in addition, the skeletal tracking system 128 can be implemented as a software application or software module, such as computer-executable software instructions that are executable with a processor or processing system of the server computing device. As a software application, the skeletal tracking system 128 can be stored on computer-readable storage memory, or with any suitable memory device or electronic data storage implemented with the server computing device.

Any of the described retail environments can include the surveillance cameras 124 that capture digital images 130, such as digital photos and/or video of the shoppers (e.g., the illustrated man, person 104, and the illustrated woman, person 106) in the retail environment 102. The digital images 130 can be captured by a network of the surveillance cameras 124 as digital photos and/or video. The skeletal tracking system 128 that is implemented by the server computing device 126 in this example can receive the captured digital images 130 and detect gestures and resulting poses of the shoppers based on skeletal tracking data 132 that is derived by image processing techniques of the captured digital images 130.

A pose estimation 134 can then be determined from the skeletal tracking data 132, where the pose estimation is an indication of a detected pose of a person in any of the described retail environments. For example, the pose estimation 134 can be determined when the person 104 (e.g., the illustrated man) picks up the item 114 based on the skeletal tracking system 128 detecting the pickup gesture 136 and subsequent pose by the person. The pose estimation 134 may also be determined when a hand of the person 104 is positioned proximate the item 114 based on the pose of the person. Additionally, the pose estimation 134 may also be based in part on detecting a head orientation 138 of the person 104, such as in this example, the person 104 who has a hand positioned proximate the item 114 or picks up the item 114 also has the head orientation 138 towards the item 114, which would indicate that the person is looking at the item 114 that has been detected as being proximate or picked up by the person.

In the described techniques of user pose and item correlation, the skeletal tracking system 128 can be implemented as the existing software solution "OpenPose", which is stated as being open-source software compatible with algorithms written in any framework. The OpenPose solution is designed to detect and track human body, hand, and facial keypoints, and is a real-time, multi-person skeletal tracking system. Generally, OpenPose detects and tracks one-hundred and thirty (130) keypoints on a person in a digital photo and/or in video of the captured digital images 130. An example 140 illustrates the keypoint skeletal tracking estimation 142 superimposed over the illustrated man, person 104. The OpenPose solution recognizes a person as a moving skeleton, from which gestures and subsequent poses can be detected based on the skeletal movement, such as the pickup gesture 136 by the person 104 to pick up the item 114. The OpenPose solution implements an 18-keypoint body tracking estimation, a 2×21-keypoint hand tracking estimation, and a 70-keypoint face tracking estimation to skeletally track one or more persons in real-time. Similarly, the example 140 illustrates the keypoint skeletal tracking estimation 144 superimposed over the illustrated woman, person 106. Further, an example 146 illustrates the keypoint skeletal tracking estimations 142, 144 as the skeletal tracking data 132 that is derived by image processing of the captured digital images 130.

In the example retail environment 102, the server computing device 126 can communicate the pose estimation 134 to the mobile phone 108 carried by the person 104 in the retail environment. Alternatively, the server computing device 126 can communicate the skeletal tracking data 132 to the mobile phone 108 carried by the person 104 in the retail environment, and the mobile phone determines the pose estimation 134 that correlates or indicates a hand of the person is positioned proximate the item 114 or the person has picked up the item 114 from the shelf in the product display case 116. The mobile phone 108 of the person 104 receives the pose estimation 134, or determines the pose estimation based on the skeletal tracking data 132, as the indication that the hand of the person is positioned proximate the item 114 or the person has picked up the item 114, and can then initiate a scan from the mobile phone 108 with an RFID reader for the wireless-enabled devices (e.g., the RFID tags) proximate the person based on the indication that the person has picked up the item. In this example, the mobile phone 108 carried by the person 104 in the retail environment 102 includes a radio frequency identification (RFID) reader implemented to transmit interrogation signals as broadcast messages requesting RFID tags that are in range to return identifying data stored in memory of the RFID tags. A RFID tag can receive an interrogation signal from the RFID reader and then wirelessly communicate the identifying data back to the RFID reader as an identification response.

As noted above in this example, the retail environment 102 may include a business server system that includes the server computing device 126. The mobile phones 108, 110 that are carried by the man and the woman may be registered as guest devices for communication with the server system. Alternatively, the mobile phones 108, 110 may be previously registered with the business server system for communication between the phones and the server computing device 126 via the Wi-Fi connected device 122. For example, the man and/or the woman may be frequent, repeat customers to the business of the retail environment 102, and they are associated with their respective devices and detected when they enter the store as shoppers. The identifiers of the respective mobile phones can be associated with each particular person by the business server system.

Further, any of the mobile phones 108, 110 or other type of wireless communication device may be setup to detect that it has entered the retail environment 102, such as when the environment is established as a geo-fenced area. Alternatively or in addition, the server computing device 126 and/or a different controller device of the retail environment can detect entry of the mobile phones 108, 110 into the geo-fenced area. For example, one or both of the shoppers may enter the retail environment 102, the server computing device 126 recognizes the mobile phone 108 or 110 that is associated with one of the shoppers, and the server computing device 126 can communicate any type of in-store coupon or other message for the user of a particular one of the mobile phones.

As described above, the mobile phone 108 of the person 104 receives the pose estimation 134, or determines the pose estimation, as the indication that the hand of the person is positioned proximate the item or the person has picked up the item 114, and can then initiate a scan from the mobile phone 108 with the RFID reader for the wireless-enabled devices proximate the person based on the indication that the hand of the person is positioned proximate the item or the person has picked up the item. In response to the scan initiated from the mobile phone 108 for the wireless-enabled devices (e.g., the RFID tags) that identify the products in the retail environment 102, the RFID reader of the mobile phone 108 receives the identifying data of the item 114 picked up by the person, and the item 114 can then be correlated with the user as an item of interest to the user. Additionally, the RFID reader of the mobile phone 108 can receive identifying data corresponding to additional items proximate the person 104 in the region of the retail environment 102 where the person has picked up the initial item. The additional items, or a category of the items, may also be correlated with the person as items of interest to the person, or as a category of items that the person may be interested in.

Similar to the skeletal tracking system 128 detecting the pickup gesture 136 from the skeletal tracking data 132 when the person 104 (e.g., the illustrated man) picks up the item 114 or the hand of the person is positioned proximate the item, and the determination of the pose estimation 134 as an indication that the person 104 is proximate or has picked up the item, the skeletal tracking system 128 can detect that the person 104 has contacted or put the item 114 down based on the skeletal tracking data 132 indicating a putdown gesture and subsequent pose. In one instance, the shopper may pick up the item 114 from the shelf in the retail environment 102, but then place the item back on the shelf, which may indicate that the person is not interested in the particular item. However, the person may be interested in a similar or related item, or in the general category of items, but is just not interested in the particular item. For example, at a cosmetics counter in a retail environment, a shopper may pick up and put back several cosmetic items before ultimately selecting one of the items for purchase. Clearly, the shopper is interested in the category of items related to cosmetics, but only one or two of the cosmetic items may be determined as being of interest to the person and/or purchased by the user.

The server computing device 126 can again communicate the pose estimation 134 or the skeletal tracking data 132 to the mobile phone 108 carried by the person 104 in the retail environment as an indication of the putdown gesture. Along with the indication of the putdown gesture and pose, the skeletal tracking system 128 can detect head movement of the person, or a lack of head movement of the person, while the person is putting the item down. For example, a lack of detected head movement may indicate that the person 104 put the item 114 back down on the shelf where the item was picked up because the person is likely still looking in the same direction, generally looking at the item or their hand and at the shelf placement location.

Alternatively, detected head movement of the person 104 may indicate that the person put the item down for portability, such as in a shopping cart or a carry basket. A detected head orientation of the person 104 that is different than the initial head orientation 138 when the item 114 was picked up may indicate that the person 104 has changed where he is looking, such as to place the item in the shopping cart or in the carry basket. Alternatively, the person 104 may simply carry the selected item 114 for purchase, in which case the person will also likely change head orientation to indicate that the person has changed where he is looking.

As noted above, the retail environment 102 may also include Real-time Locating System (RTLS) devices, such as usable in a geo-fenced area for real-time tracking and to provide accurate location information related to specific regions where user devices (e.g., the mobile phones 108, 110) are located within the retail environment. Alternatively or in addition, sensors integrated in a mobile phone, such as an inertial measurement unit of the device, can be utilized to detect a person moving from one location to another in the retail environment (e.g., a geo-fenced area).

As a feature of user pose and item correlation, the mobile phone 108 can detect that the person 104 has moved location in the retail environment 102 to a region other than where the person picked up the item 114. The mobile phone 108 can then initiate a rescan for the wireless-enabled devices (e.g., the RFID tags) proximate the person at the new location, and receive the identifying data corresponding to the items proximate the person at the new location in the region of the retail environment. If the RFID reader of the mobile phone still receives the identifying data of the item 114 picked up earlier by the person 104, then the mobile phone 108 can determine that the person has retained possession of the item of interest to the user.

As noted above, the person may place the item 114 in a shopping cart or a carry basket for portability, or may simply carry the selected item 114 for purchase while moving to the new location or region in the retail environment. As an additional feature, the checkout system in a business of the retail environment 102 will track the actual item purchases, and the server computing device 126 can be implemented to correlate the item purchases with items that the person has currently placed in a shopping cart or is carrying. If a determination is made that the person is still carrying an item out of the retail environment, but has not completed a purchase of the item, then this circumstance may initiate checking into whether the item has been shop-lifted, or possibly left at the checkout register.

In other aspects of user pose and item correlation, the items and/or categories of items that are correlated with a person as items of interest to the person, can be communicated from a user device (e.g., the mobile phones 108, 110) back to the server computing device 126 for the business of the retail environment 102. The server computing device 126 can also be implemented to track purchases of items by the person, which are also correlated as items of interest with the person. The business can then track the items that a particular person is interested in, as well as previous customer shopping selections, interests, and purchases. The business may also then offer the correlated items on-sale, such as in the form of an e-coupon communicated to the mobile phone 108 of the person 104 as the mobile phone is detected entering the retail environment. Generally, the business can use the item correlation information to improve shopping experiences for users of identified mobile devices by communicating reminders, coupons, advertisements, and the like to the mobile devices of the users.

Figure 2:
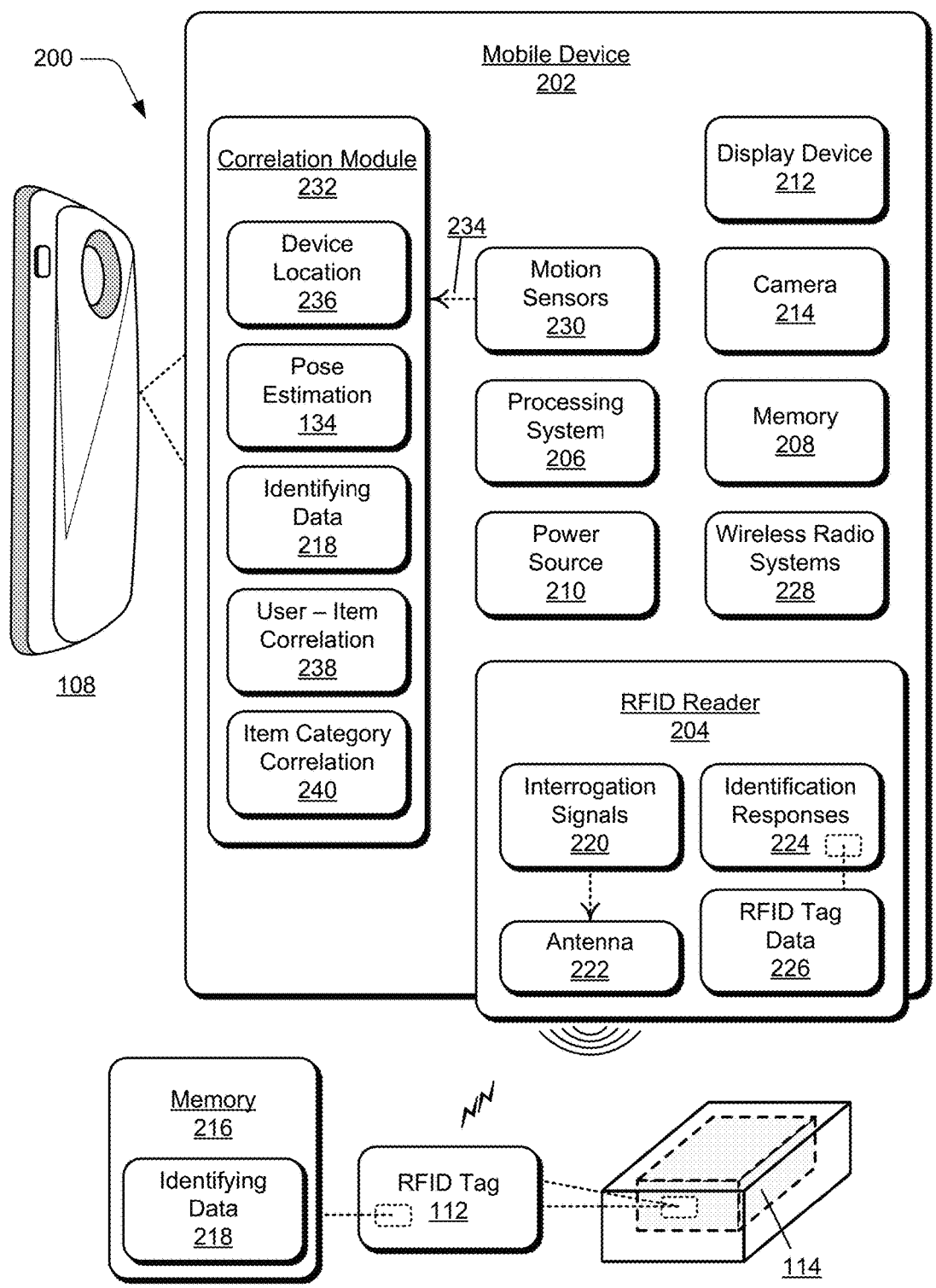
FIG. 2 illustrates an example system for user pose and item correlation in accordance with one or more implementations described herein.

FIG. 2 illustrates an example system 200 in which aspects of user pose and item correlation can be implemented. The example system 200 includes any type of a mobile device 202, such as a tablet device, a wearable device, or either of the mobile phones 108, 110 shown and described with reference to FIG. 1, that includes a radio frequency identification (RFID) reader 204, either as an integrated component of the mobile device 202 or as an attachment that operates with the mobile device. Generally, the mobile device 202 is any type of an electronic and/or computing device implemented with various components, such as a processing system 206 and memory 208, as well as any number and combination of different components as further described with reference to the example device shown in FIG. 5. For example, the mobile device 202 can include a power source 210 to power the device, such as a rechargeable battery and/or any other type of active or passive power source that may be implemented in an electronic and/or computing device. The mobile device 202 can also include an integrated display device 212 and a camera 214.

The example system 200 can include any number of RFID tags, such as the RFID tag 112, which has RFID tag memory 216 that stores identifying data 218 as a unique identifier of the particular RFID tag, as well as data that identifies the respective tagged item 114 associated with the RFID tag 112. The RFID tag 112 is implemented for two-way wireless communication with the RFID reader 204 (also referred to as a RFID interrogator) that interrogates the RFID tag 112 for the identifying data 218 stored in the RFID tag memory 216. The RFID reader 204 can transmit interrogation signals 220 via an antenna 222 (or antenna system) as broadcast messages requesting RFID tags 112, 118, 120 that are in range to return the tag data stored in memory of the RFID tags. The antenna 222 may be a directional antenna or an omnidirectional antenna, usable by the RFID reader 204 to transmit the interrogation signals 220 to the RFID tags.

The RFID tag 112 can receive an interrogation signal 220 from the RFID reader 204 and then wirelessly communicate the identifying data 218 about the item 14 back to the RFID reader via a radio frequency (RF) communication channel, which the RFID reader 204 receives as identification responses 224. The identification responses 224 from the RFID tag 112 include the RFID tag data 226 (e.g., the identifying data 218, unique identifier of the RFID tag, and/or other metadata) stored in the RFID tag memory 216. Generally, the RFID tag 112 (and other RFID tags described herein) includes a RFID antenna and a RF interface as a transceiver for two-way communication with the RFID reader 204. In response to receipt of an interrogation signal 220 from the RFID reader 204, an ASIC/CPU module of the RFID tag 112 formulates a response that includes the identifying data 218 from the RFID tag, and the response is wirelessly transmitted to the RFID reader. The identification responses 224 received by the RFID reader 204 from the RFID tag 112 can be communicated using low frequency (LF), high frequency (HF), or ultra-high frequency (UHF) radio waves.

In addition to the RFID implementation, the mobile device 202 can include various, different wireless radio systems 228, such as for Wi-Fi, Bluetooth™, Mobile Broadband, LTE, Near Field Communication (NFC), Real-time Locating System (RTLS), or any other wireless radio system or format for communication via respective wireless networks. Generally, the mobile device 202 implements the wireless radio systems 228 that each include a radio device, antenna, and chipset implemented for cellular, wireless, and/or other network communication with other devices, networks, and services. A wireless radio system 228 can be configured to implement any suitable communication protocol or standard. Although features and aspects of user pose and item correlation are described and illustrated in the context of RFID tags, the described features and aspects can be implemented with various radio-based, wireless tag signaling, such as with LTE, NFC, RTLS, Bluetooth™ devices, and the like.

The mobile device 202 includes motion sensors 230 (or a single motion sensor) to sense motion of the mobile device 202 as a user moves and changes orientations of the device and/or as the device moves with the user to various different locations. The motion sensors 230 can be implemented with various sensors, such as a gyroscope, an accelerometer, and/or other types of motion sensors to sense motion of the mobile device. The various motion sensors 230 may also be implemented as components of an inertial measurement unit in the mobile device. The motion sensors 230 generate sensor data vectors having three-dimensional parameters (e.g., rotational vectors in x, y, and z coordinates) indicating position, location, and/or orientation of the mobile device 202. For example, a user of the mobile device 202 may hold the device in any orientation, such as vertical (perpendicular) as shown in the figure, horizontal (parallel), or at any other angle and rotational orientation.

The mobile device 202 also includes a correlation module 232 that implements features of user pose and item correlation, as described herein. The correlation module 232 may include independent processing, memory, and logic components functioning as a computing and/or electronic device integrated with the mobile device 202. Alternatively or in addition, the correlation module 232 can be implemented as a software application or software module, such as computer-executable software instructions that are executable with a processor (e.g., with the processing system 206). As a software application, the correlation module 232 can be stored on computer-readable storage memory (e.g., the memory 208), or any suitable memory device or electronic data storage implemented with the correlation module.

The correlation module 232 receives motion sensor inputs 234 from the motion sensors 230, which are an indication that the mobile device 202 is changing orientation in three-dimensional space and/or changing locations as the device moves with a user of the device. The correlation module 232 can be implemented to track movement of the mobile device 202 based on the motion sensor inputs 234 and can identify a device location 236 of the mobile device relative to the retail environment 102 in which the mobile device is located. The correlation module 232 can also initiate the RFID reader 204 to begin scanning for RFID tags by transmitting the interrogation signals 220 based on the location of the mobile device 202 in the retail environment.

As described with reference to the example retail environment 102 shown in FIG. 1, the server computing device 126 can communicate the pose estimation 134 to the mobile phone 108 (e.g., an example of the mobile device 202) carried by the person 104 in the retail environment. Alternatively, the server computing device 126 can communicate the skeletal tracking data 132 to the mobile phone 108 carried by the person 104 in the retail environment, and the mobile phone determines the pose estimation 134 that correlates or indicates the hand of the person is positioned proximate the item 114 or the person has picked up the item 114 from the shelf in the product display case 116. The correlation module 232 of the mobile phone 108 carried by the person 104 can receive the pose estimation 134, or determine the pose estimation based on the skeletal tracking data 132, as the indication that the hand of the person is positioned proximate the item 114 or the person has picked up the item 114, and can then initiate a scan from the mobile device with the RFID reader 204 for the wireless-enabled devices (e.g., the RFID tags) proximate the person based on the indication that the person is proximate or has picked up the item.

In response to the scan for the wireless-enabled devices (e.g., the RFID tags) that identify the items in the retail environment 102, the RFID reader 204 receives the identifying data 218 of the item 114 picked up by the person 104 or positioned proximate to a hand of the person. Additionally, the RFID reader 204 can receive identifying data corresponding to additional items proximate the person 104 in a region of the retail environment 102 where the hand of the person is positioned proximate the initial item or the person has picked up the initial item. The correlation module 232 is implemented to correlate the item 114 with the person 104 as the user-item correlation 238, which identifies the item 114 as an item of interest to the person. Additionally, the correlation module 232 can correlate the additional items, as well as a category of the items, with the person 104 as the item category correlation 240, which identifies the category of items that the person may be interested in.

As noted with reference to FIG. 1, the server computing device 126 may also implement the correlation module 232, or features of the correlation module. The correlation module 232 can also initiate communication of the items that are correlated with a person as the items of interest to the person (e.g., the user-item correlation 238) and/or the categories of items (e.g., the item category correlation 240) from the mobile device 202 back to the server computing device 126 for the business of the retail environment 102.

Any of the server, computing, and mobile devices described herein can communicate via any type of communication and data network (or combination of networks), such as for data communication between the mobile phone 108, the Wi-Fi connected device 122, the server computing device 126 of the retail environment, and/or a cloud-based service. The network can be implemented to include a wired and/or wireless network, may be implemented using any type of network topology and/or communication protocol, and can be represented or otherwise implemented as a combination of two or more networks, to include cellular networks, IP-based networks, and/or the Internet. The network may also include mobile operator networks that are managed by a network provider of a cellular network, a mobile network operator, and/or other network operators, such as a communication service provider, mobile phone provider, and/or Internet service provider.

Example methods 300 and 400 are described with reference to respective FIGS. 3 and 4 in accordance with implementations of user pose and item correlation. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
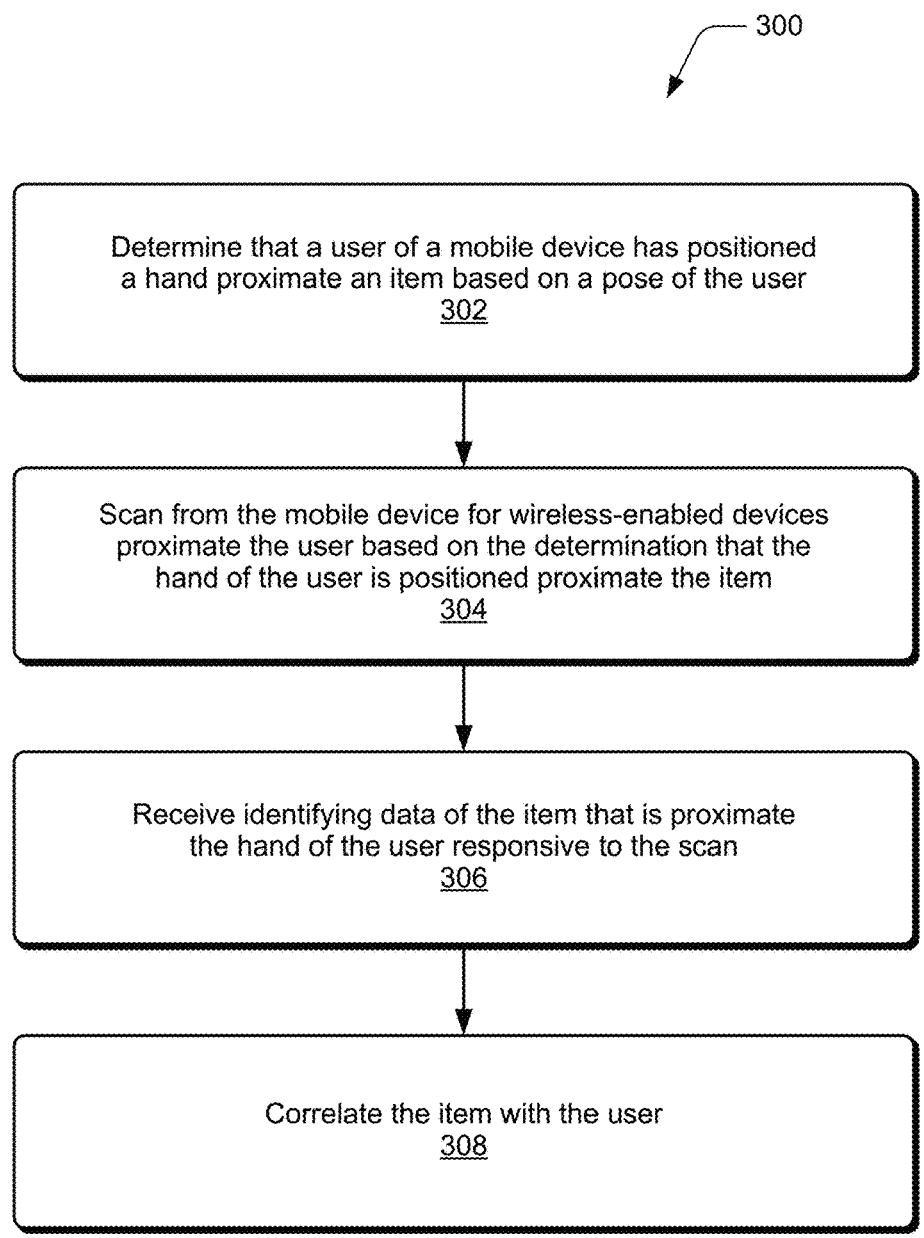
FIG. 3 illustrates an example method of user pose and item correlation in accordance with one or more implementations described herein.

FIG. 3 illustrates example method(s) 300 of user pose and item correlation as described herein, and the method is generally described with reference to a mobile device implemented for communication with a wireless tag that corresponds to an item in a retail environment. The order in which the method is described is not intended to be construed as a limitation, and any number or combination of the described method operations can be performed in any order to perform a method, or an alternate method.

At 302, a determination is made that a user of a mobile device has positioned a hand proximate an item based on a pose of the user. For example, the correlation module 232 of the mobile device 202 (e.g., the mobile phone 108) determines that a hand of the person 104 is positioned proximate the item 114, or the person 104 has picked up the item 114 based on a pose of the person. The pose estimation 134 is determined when a hand of the person 104 (e.g., the illustrated man) is positioned proximate the item 114, or the person 104 picks up the item 114 based on the skeletal tracking system 128 detecting the pickup gesture 136 and a subsequent pose by the person. Additionally, the pose estimation 134 may also be based in part on detecting a head orientation 138 of the person 104, where the person 104 who is proximate the item 114 or picks up the item 114 also has the head orientation 138 towards the item 114, which would indicate that the person is looking at the item 114 that has been detected as being proximate, contacted, or picked up by the person. Additionally, the skeletal tracking system 128 receives the captured digital images 130 from the network of the surveillance cameras 124 in the retail environment 102 and detects gestures of the shoppers based on the skeletal tracking data 132 that is derived by image processing techniques of the captured digital images 130.

In the example retail environment 102 shown and described with reference to FIG. 1, the server computing device 126 communicates the pose estimation 134 to the mobile phone 108 carried by the person 104 in the retail environment. Alternatively, the server computing device 126 can communicate the skeletal tracking data 132 to the mobile phone 108 carried by the person 104 in the retail environment, and the mobile phone determines the pose estimation 134 that correlates or indicates the hand of the person is positioned proximate the item 114 or the person has picked up the item 114 from the shelf in the product display case 116. The mobile phone 108 of the person 104 receives the pose estimation 134, or determines the pose estimation based on the skeletal tracking data 132, as the indication that the person is proximate or has picked up the item 114.

At 304, a scan is initiated from the mobile device for wireless-enabled devices proximate the user based on the determination that the hand of the user is positioned proximate the item. For example, the correlation module 232 of the mobile device 202 (e.g., the mobile phone 108) initiates a scan from the mobile phone 108 with the RFID reader 204 for the wireless-enabled devices (e.g., the RFID tags 112, 118) proximate the person 104 based on the indication that the hand of the person is positioned proximate the item 114 or the person has picked up the item 114. The RFID tag 112 identifies the item 114, and the RFID reader 204 interrogates the RFID tag 112 to request the identifying data 218 stored on the RFID tag.

At 306, identifying data of the item that is proximate the hand of the user is received responsive to the scan. For example, the RFID reader 204 of the mobile phone 108 receives the identifying data 218 of the item 114 that is proximate the hand of the person 104 or has been picked up by the person. Additionally, the RFID reader 204 receives identifying data corresponding to additional items proximate the person 104 in a region of the retail environment 102 where the person is proximate or has picked up the initial item.

At 308, the item is correlated with the user. For example, the correlation module 232 of the mobile device 202 (e.g., the mobile phone 108) correlates the item 114 with the person 104 as the user-item correlation 238, which identifies the item 114 as an item of interest to the person. Additionally, the correlation module 232 can correlate the additional items, as well as a category of the items, with the person 104 as the item category correlation 240, which identifies the category of items that the person may be interested in.

Figure 4:
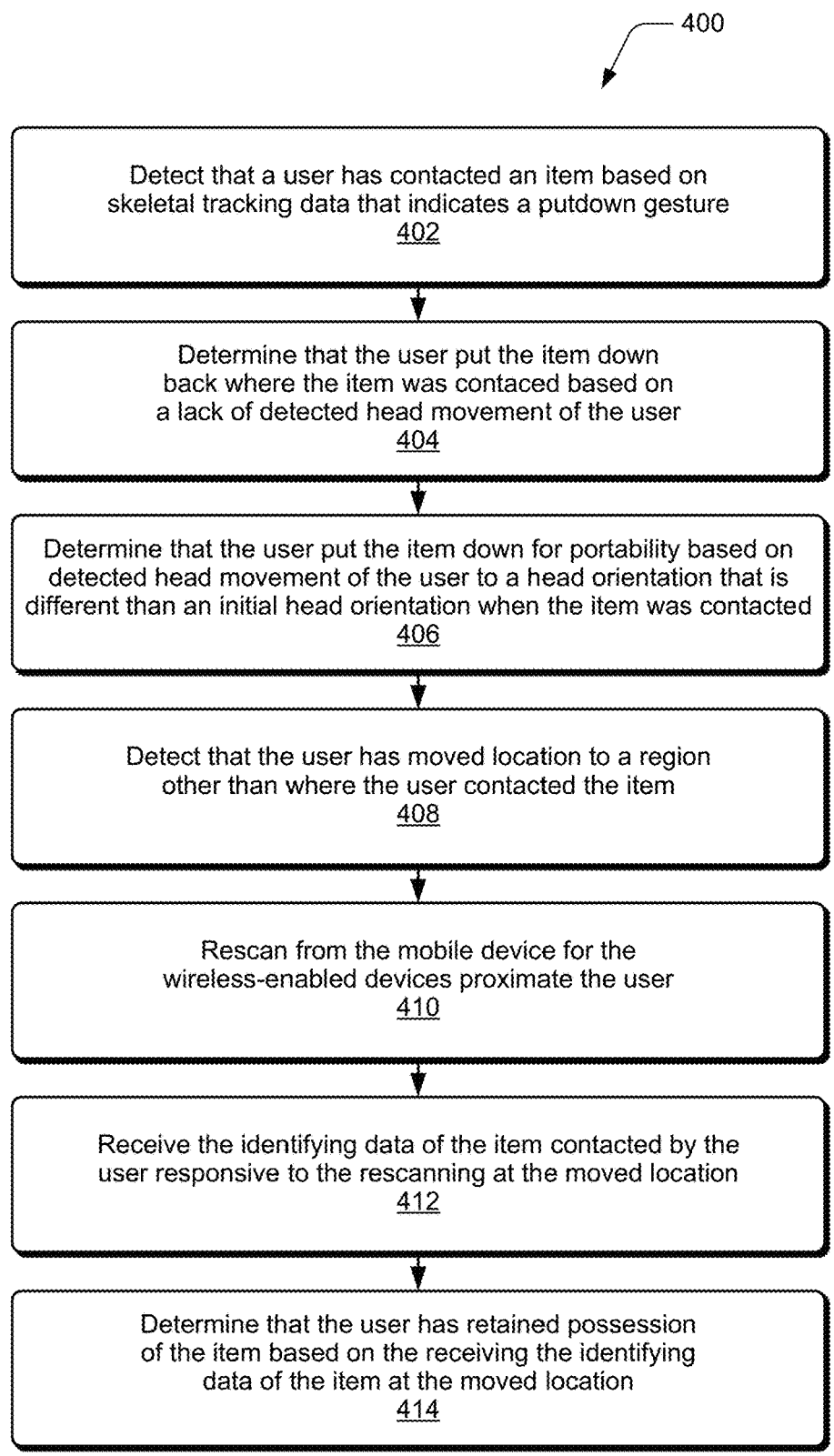
FIG. 4 illustrates an example method of user pose and item correlation in accordance with one or more implementations described herein.

FIG. 4 illustrates example method(s) 400 of user pose and item correlation as described herein. The order in which the method is described is not intended to be construed as a limitation, and any number or combination of the described method operations can be performed in any order to perform a method, or an alternate method.

At 402, a user is detected as contacting an item based on skeletal tracking data that indicates a putdown gesture. For example, the skeletal tracking system 128 implemented by the server computing device 126 detects that the person 104 has contacted the item 114 or put the item down based on the skeletal tracking data 132 indicating a putdown gesture and subsequent pose. Additionally, at 404, a determination is made that the user put the item down back where the item was contacted based on a lack of detected head movement of the user. For example, along with the detected putdown gesture and pose, the skeletal tracking system 128 can detect head movement of the person, or a lack of head movement of the person, while the person contacts the item or is putting the item down. In this instance, a lack of detected head movement may indicate that the person 104 put the item 114 back down on the shelf where the item was picked up because the person is likely still looking in the same direction, generally looking at the item 114 or their hand and at the shelf placement location.

Alternatively, at 406, a determination is made that the user put the item down for portability based on detected head movement of the user to a head orientation that is different than an initial head orientation when the item was contacted. For example, the skeletal tracking system 132 can detect head movement of the person 104, which may indicate that the person put the item down for portability, such as in a shopping cart or a carry basket. A detected head orientation of the person 104 that is different than the initial head orientation 138 when the item 114 was contacted or picked up may indicate that the person 104 has changed where he is looking, such as to place the item in the shopping cart or in the carry basket. Alternatively, the person 104 may simply carry the selected item 114 for purchase, in which case the person will also likely change head orientation to indicate that the person has changed where he is looking.

At 408, the user is detected having moved location to a region other than where the user contacted the item. For example, the correlation module 232 of the mobile phone 108 detects that the person 104 has moved location in the retail environment 102 to a region other than where the person contacted or picked up the item 114, such as based on the real-time tracking with the RTLS devices in the retail environment 102 and/or based on the motion sensor inputs 234 from the motion sensors 230. The motion sensor inputs 234 are an indication that the mobile device 202 is changing orientation in three-dimensional space and/or changing locations as the device moves with the user of the device.

At 410, a rescan is initiated from the mobile device for the wireless-enabled devices proximate the user and, at 412, the identifying data of the item contacted by the user is received responsive to the rescanning at the moved location. For example, the correlation module 232 of the mobile phone 108 then initiates a rescan for the wireless-enabled devices (e.g., the RFID tags) proximate the person 104 at the new location, and receives the identifying data 218 corresponding to the items proximate the person at the new location in the region of the retail environment 102.

At 414, a determination is made that the user has retained possession of the item based on the receiving the identifying data of the item at the moved location. For example, the correlation module 232 of the mobile phone 108 determines that the person 104 has retained possession of the item 114 of interest to the user based on the RFID reader 204 of the mobile phone still receives the identifying data 218 of the item 114 contacted or picked up earlier by the person in the retail environment 102.

Figure 5:
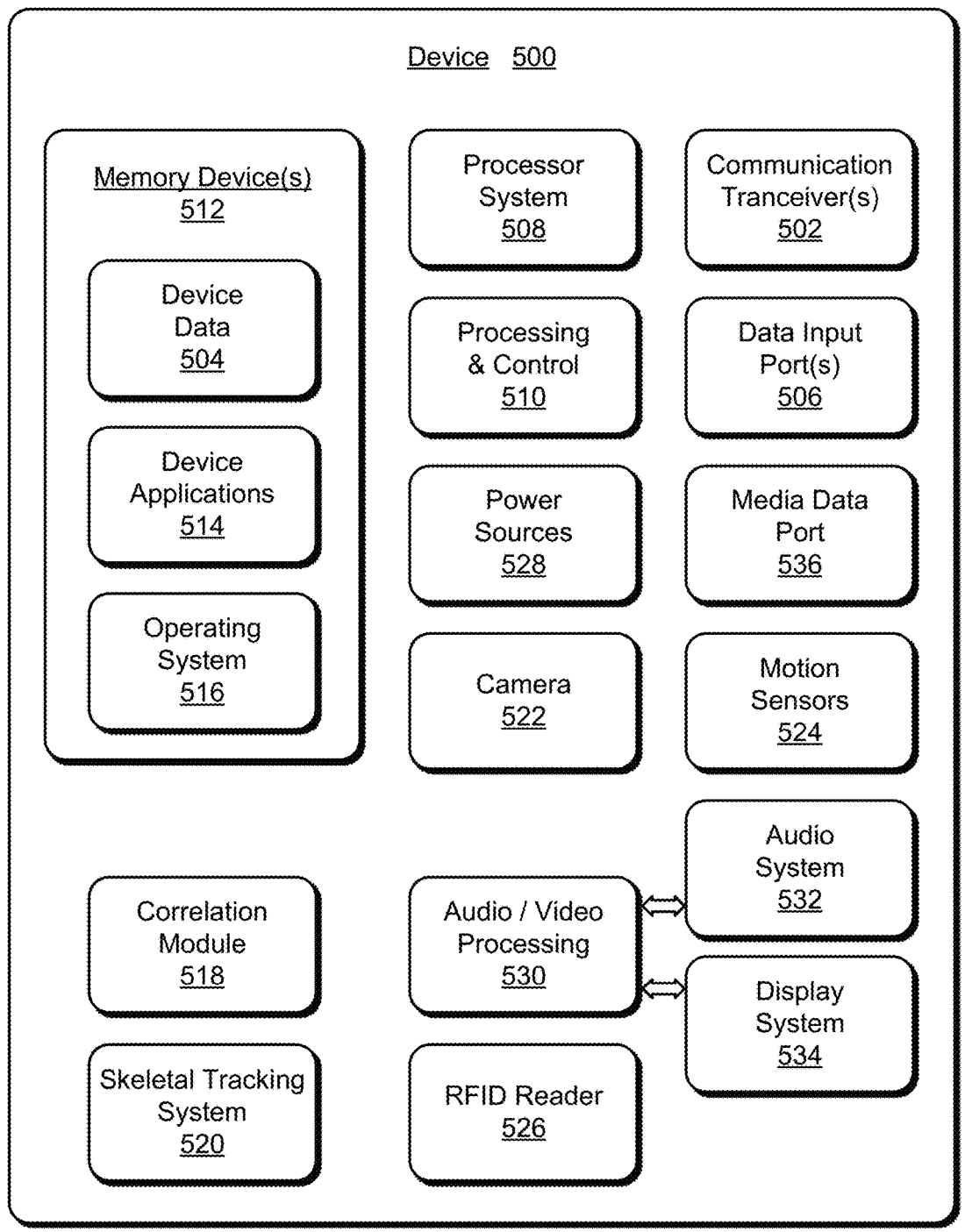
FIG. 5 illustrates various components of an example device that can implement aspects of user pose and item correlation.

FIG. 5 illustrates various components of an example device 500 in which aspects of user pose and item correlation can be implemented. The example device 500 can be implemented as any of the devices described with reference to the previous FIGS. 1-4, such as any type of mobile device, mobile phone, client device, wearable device, tablet, computing, communication, entertainment, gaming, media playback, and/or other type of electronic device. For example, the server computing device 126, the mobile phones 108, 110, and the mobile device 202 shown and described with reference to FIGS. 1-4 may be implemented as the example device 500. Further a wearable device may include any one or combination of a watch, armband, wristband, bracelet, glove or pair of gloves, glasses, jewelry items, clothing items, any type of footwear or headwear, and/or other types of wearables.

The device 500 includes communication transceivers 502 that enable wired and/or wireless communication of device data 504 with other devices. The device data 504 can include any of the item identifying data, device location data, skeletal tracking data, captured digital images, pose estimations, user-item correlations, and item category correlations. Additionally, the device data 504 can include any type of audio, video, and/or image data. Example communication transceivers 502 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 (e.g., memory devices) that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on.

In this example, the device 500 includes a correlation module 518 that implements aspects of user pose and item correlation, and may be implemented with hardware components and/or in software as one of the device applications 514, such as when the device 500 is implemented as the mobile device 202 described with reference to FIGS. 1-4. An example of the correlation module 518 is the correlation module 232 that is implemented as a software application and/or as hardware components in the mobile device 202. In implementations, the correlation module 518 may include independent processing, memory, and logic components as a computing and/or electronic device integrated with the device 500. The device 500 also includes a skeletal tracking system 520 that implements aspects of user pose and item correlation, and may be implemented with hardware components and/or in software as one of the device applications 514, such as when the device 500 is implemented as the server computing device 126 described with reference to FIGS. 1-4. An example of the skeletal tracking system 520 is the skeletal tracking system 128 that is implemented as a software application and/or as hardware components in the server computing device 126. In implementations, the skeletal tracking system 520 may include independent processing, memory, and logic components as a computing and/or electronic device integrated with the device 500.

In this example, the example device 500 also includes a camera 522 and motion sensors 524, such as may be implemented in an inertial measurement unit (IMU). The motion sensors 524 can be implemented with various sensors, such as a gyroscope, an accelerometer, and/or other types of motion sensors to sense motion of the device. The various motion sensors 524 may also be implemented as components of an inertial measurement unit in the device.

The device 500 also includes a radio-frequency identification (RFID) reader 526 that is implemented to interrogate RFID tags for identifying data and receive identification responses from the RFID tags. An example of the RFID reader 526 is the RFID reader 204 that is implemented as an integrated component of the mobile device 202 or as an attachment that operates with the mobile device. The device 500 can also include one or more power sources 528, such as when the device is implemented as a mobile device. In implementations, an RFID reader as an attachment to the device 500 has an external power source. The power sources may include a charging and/or power system, and can be implemented as a flexible strip battery, a rechargeable battery, a charged super-capacitor, and/or any other type of active or passive power source.

The device 500 also includes an audio and/or video processing system 530 that generates audio data for an audio system 532 and/or generates display data for a display system 534. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 536. In implementations, the audio system and/or the display system are integrated components of the example device. Alternatively, the audio system and/or the display system are external, peripheral components to the example device.

Although implementations of user pose and item correlation have been described in language specific to features and/or methods, the subject of the appended claims is not necessarily limited to the specific features or methods described. Rather, the features and methods are disclosed as example implementations of user pose and item correlation, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method comprising: determining that a user of a mobile device has positioned a hand proximate an item based on a pose of the user; scanning from the mobile device for wireless-enabled devices proximate the user based on the determining that the hand of the user is positioned proximate the item; receiving identifying data of the item that is proximate the hand of the user responsive to the scanning; and correlating the item with the user.

Alternatively or in addition to the above described method, any one or combination of: determining that the hand of the user is positioned proximate the item comprises detecting the pose of the user based on a pose estimation that indicates the user is holding the item and has a head orientation towards the item. The pose estimation is based on captured digital images of the user. Determining that the hand of the user is positioned proximate the item comprises detecting a pickup gesture by the user based on skeletal tracking data that indicates the pose and head movement in a direction towards the item. The skeletal tracking data is derived from captured digital images of the user moving to pick up the item. The correlating the item with the user is based on an identifier of the mobile device that is associated with the user. Receiving the identifying data corresponding to additional items proximate the user in a region where the hand of the user is positioned proximate the item; and correlating the additional items with the user. Detecting that the user has contacted the item based on skeletal tracking data that indicates a putdown gesture, and one of: determining that the user put the item down back where the item was contacted based on a lack of detected head movement of the user; or determining that the user put the item down for portability based on detected head movement of the user to a head orientation that is different than an initial head orientation when the item was contacted. Detecting that the user has moved location to a region other than where the user contacted the item; rescanning from the mobile device for the wireless-enabled devices proximate the user; receiving the identifying data of the item contacted by the user responsive to the rescanning at the moved location; and determining that the user has retained possession of the item based on the receiving the identifying data of the item at the moved location. A wireless-enabled device that corresponds to the picked up item is a RFID tag that identifies the item; and the scanning from the mobile device comprises interrogating the RFID tag by a RFID reader of the mobile device to request the identifying data stored on the RFID tag.

A mobile device, comprising: wireless radio systems to scan for wireless-enabled devices corresponding to items that are tagged with the wireless-enabled devices; a correlation module implemented to: receive an indication that a user of the mobile device has positioned a hand proximate an item based on a pose of the user; initiate a scan from the mobile device for the wireless-enabled devices proximate the user based on the indication that the hand of the user is positioned proximate the item; receive identifying data of the item that is proximate the hand of the user responsive to the scan of the wireless-enabled devices; and correlate the item with the user.

Alternatively or in addition to the above described mobile device, any one or combination of: the indication that the hand of the user is positioned proximate the item is based on detection of the pose from a pose estimation that indicates the user is holding the item and has a head orientation towards the item; and the pose estimation is based on captured digital images of the user. The indication that the hand of the user is positioned proximate the item is based on detection of a pickup gesture by the user from skeletal tracking data that indicates the pose and head movement in a direction towards the item; and the skeletal tracking data is derived from captured digital images of the user moving to pick up the item. The correlation module is implemented to: receive the identifying data corresponding to additional items proximate the user in a region where the hand of the user is positioned proximate the item; and correlate the additional items with the user. The correlation module is implemented to: receive another indication that the user has contacted the item based on skeletal tracking data that indicates a putdown gesture, and one of: determine that the user put the item down back where the item was contacted based on a lack of detected head movement of the user; or determine that the user put the item down for portability based on detected head movement of the user to a head orientation that is different than an initial head orientation when the item was contacted. The correlation module is implemented to: determine that the user has moved location to a region other than where the user picked contacted item; initiate a rescan from the mobile device for the wireless-enabled devices proximate the user; receive the identifying data of the item contacted by the user responsive to the rescan at the moved location; and determine that the user has retained possession of the item based on the identifying data of the item received at the moved location. The wireless-enabled device that corresponds to the item is a RFID tag that identifies the item; and the mobile device further comprising a RFID reader to interrogate the RFID tag as the scan to request the identifying data stored on the RFID tag.

A system comprising: a server computing device to determine that a hand of a person is positioned proximate an item based on a pose of the person; a mobile device associated with the person, the mobile device configured to: receive a communication from the server computing device indicating that the hand of the person is positioned proximate the item; initiate a scan for wireless-enabled devices proximate the person based on the communication from the server computing device; receive identifying data of the item that is proximate the hand of the person responsive to the scan of the wireless-enabled devices; and correlate the item with the person.

Alternatively or in addition to the above described system, any one or combination of: the server computing device determines that the hand of the person is positioned proximate the item based on detection of the pose from skeletal tracking data that is derived from captured digital images of the person moving to pick up the item. The mobile device is configured to: determine that the person has moved location to a region other than where the person contacted the item; initiate a rescan for the wireless-enabled devices proximate the person; receive the identifying data of the item contacted by the person responsive to the rescan at the moved location; and determine that the person has retained possession of the item based on the identifying data of the item received at the moved location.

The invention claimed is:

1. A method, comprising:
   determining that a user of a mobile device has positioned a hand proximate an item based on a pose of the user;
   scanning from the mobile device for wireless-enabled devices proximate the user based on the determining that the hand of the user is positioned proximate the item;
   receiving identifying data of the item that is proximate the hand of the user responsive to the scanning;
   detecting that the user has contacted the item based on skeletal tracking data; and
   determining that the user put the item down back where the item was contacted based on a lack of detected head movement of the user.

2. The method as recited in claim 1, wherein the determining that the hand of the user is positioned proximate the item comprises detecting the pose of the user based on a pose estimation that indicates the user is holding the item and has a head orientation towards the item.

3. The method as recited in claim 2, wherein the pose estimation is based on captured digital images of the user.

4. The method as recited in claim 1, wherein the determining that the hand of the user is positioned proximate the item comprises detecting a pickup gesture by the user based on the skeletal tracking data that indicates the pose and head movement in a direction towards the item.

5. The method as recited in claim 4, wherein the skeletal tracking data is derived from captured digital images of the user moving to pick up the item.

6. The method as recited in claim 1, wherein the correlating the item with the user is based on an identifier of the mobile device that is associated with the user.

7. The method as recited in claim 1, further comprising:
   receiving the identifying data corresponding to additional items proximate the user in a region where the hand of the user is positioned proximate the item; and
   correlating the additional items with the user.

8. The method as recited in claim 1, further comprising:
determining that the user put the item down for portability based on detected head movement of the user to a head orientation that is different than an initial head orientation when the item was contacted.

9. The method as recited in claim 1, further comprising:
detecting that the user has moved location to a region other than where the user contacted the item;
rescanning from the mobile device for the wireless-enabled devices proximate the user;
receiving the identifying data of the item contacted by the user responsive to the rescanning at the moved location; and
determining that the user has retained possession of the item based on the receiving the identifying data of the item at the moved location.

10. The method as recited in claim 1, wherein:
a wireless-enabled device that corresponds to the picked up item is a RFID tag that identifies the item; and
the scanning from the mobile device comprises interrogating the RFID tag by a RFID reader of the mobile device to request the identifying data stored on the RFID tag.

11. A mobile device, comprising:
wireless radio systems to scan for wireless-enabled devices corresponding to items that are tagged with the wireless-enabled devices;
a correlation module implemented at least partially in hardware with a processor to:
receive an indication that a user of the mobile device has positioned a hand proximate an item based on a pose of the user;
initiate a scan from the mobile device for the wireless-enabled devices proximate the user based on the indication that the hand of the user is positioned proximate the item;
receive identifying data of the item that is proximate the hand of the user responsive to the scan of the wireless-enabled devices;
receive another indication that the user has contacted the item based on skeletal tracking data; and
determine that the user put the item down for portability based on detected head movement of the user to a head orientation that is different than an initial head orientation when the item was contacted.

12. The mobile device as recited in claim 11, wherein:
the indication that the hand of the user is positioned proximate the item is based on detection of the pose from a pose estimation that indicates the user is holding the item and has a head orientation towards the item; and
the pose estimation is based on captured digital images of the user.

13. The mobile device as recited in claim 11, wherein:
the indication that the hand of the user is positioned proximate the item is based on detection of a pickup gesture by the user from the skeletal tracking data that indicates the pose and head movement in a direction towards the item; and
the skeletal tracking data is derived from captured digital images of the user moving to pick up the item.

14. The mobile device as recited in claim 11, wherein the correlation module is implemented to:
receive the identifying data corresponding to additional items proximate the user in a region where the hand of the user is positioned proximate the item; and
correlate the additional items with the user.

15. The mobile device as recited in claim 11, wherein the correlation module is implemented to:
determine that the user put the item down back where the item was contacted based on a lack of detected head movement of the user.

16. The mobile device as recited in claim 11, wherein the correlation module is implemented to:
determine that the user has moved location to a region other than where the user contacted the item;
initiate a rescan from the mobile device for the wireless-enabled devices proximate the user;
receive the identifying data of the item contacted by the user responsive to the rescan at the moved location; and
determine that the user has retained possession of the item based on the identifying data of the item received at the moved location.

17. The mobile device as recited in claim 11, wherein:
the wireless-enabled device that corresponds to the item is a RFID tag that identifies the item; and
the mobile device further comprising a RFID reader to interrogate the RFID tag as the scan to request the identifying data stored on the RFID tag.

18. A system, comprising:
a server computing device to determine that a hand of a person is positioned proximate an item based on a pose of the person;
a mobile device associated with the person, the mobile device configured to:
receive a communication from the server computing device indicating that the hand of the person is positioned proximate the item;
initiate a scan for wireless-enabled devices proximate the person based on the communication from the server computing device;
receive identifying data of the item that is proximate the hand of the person responsive to the scan of the wireless-enabled devices;
correlate the item with the person;
determine that the person has moved location to a region other than where the person contacted the item; and
determine that the person has retained possession of the item based on the identifying data of the item received at the moved location.

19. The system as recited in claim 18, wherein the server computing device determines that the hand of the person is positioned proximate the item based on detection of the pose from skeletal tracking data that is derived from captured digital images of the person moving to pick up the item.

20. The system as recited in claim 19, wherein the mobile device is configured to:
initiate a rescan for the wireless-enabled devices proximate the person responsive to the person has moved location; and
receive the identifying data of the item contacted by the person responsive to the rescan at the moved location.

* * * * *